March 22, 1927.
H. DUMARS ET AL
1,622,134
MEANS FOR GAS SEPARATION
Filed Nov. 28, 1923
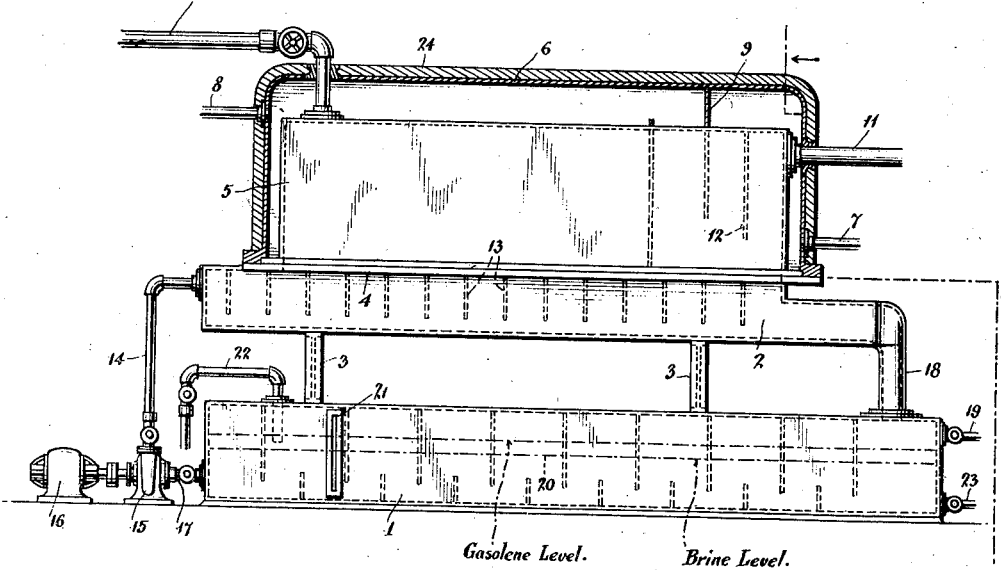
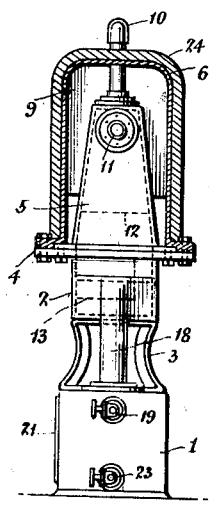
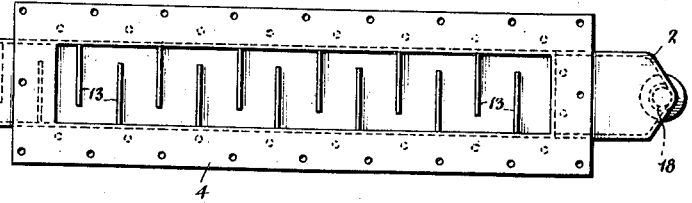
Inventors
Horace Dumars and
William Spencer Bowen,
By
Attorney Patented Mar. 22, 1927.

1,622,134

UNITED STATES PATENT OFFICE.

HORACE DUMARS, OF NEW SUFFOLK, AND WILLIAM SPENCER BOWEN, OF NEW YORK, N. Y., ASSIGNORS TO BOWEN-DUMARS POWER CORPORATION, OF NEW YORK, N. Y., A CORPORATION OF NEW YORK.

MEANS FOR GAS SEPARATION.

Application filed November 28, 1923. Serial No. 677,528.

This invention relates to a means for drying a single specific gas or a group of gases forming part of the constituency of a mixture of gases, by subjecting the mixture to refrigeration for reducing the temperature to a point appropriately low to cause change of state of the gases which it is desired to segregate from the dried gas, said gases, in their changed state being then removed from the mixture in any suitable manner.

One of the objects of the invention is the promulgation of the method as above outlined.

Another object is the construction of apparatus for accomplishing this result.

A subordinate object is the provision of the "liquid belt" or conveyer for carrying off the separated constituents of the mixture.

Other objects will appear as the description proceeds.

In the specific embodiment of the invention shown in the drawings, the apparatus is especially designed for the treatment of the gases issuing from some of the natural gas wells in which methane, gasoline and water issue in mixture at a sufficiently high temperature to maintain all the said constituents thereof in gaseous state. It is to be understood, however, that any mixture of gases is susceptible of similar treatment.

In the drawings:

Figure 1 is a longitudinal section through a gas drying apparatus.

Figure 2 is a transverse section taken along the line 2—2 of Figure 1.

Figure 3 is a horizontal section taken along the line 3—3 of Figure 1.

Referring now in detail to the several figures, the numeral 1 represents a brine tank which serves as a foundation for supporting the conveyer tank 2, the latter being carried by I-beams or other suitable sustaining members 3 which rest upon the top of the tank 1. These tanks may be made in any desired manner or shape, the conveyer tank being shown as open at the top and having the upper edge thereof surrounded by a wide flange 4. This flange serves to support two flanged receptacles, the closed separating or condensing chamber 5, and a jacket 6 therefor of larger size than said separating chamber and forming a space around the walls of the latter. This space is for the reception of circulating brine, or other refrigerant which enters by the pipe 7 and leaves by the pipe 8. In the present instance, in which gasoline and water are the two condensates from which it is desired to segregate the pure methane gas, the brine is preferably an aqueous liquid, non-miscible with the liquid condensate but miscible with the solid condensate when the latter is either in its solid or liquid state. Preferably, the temperature of the brine is below the liquefaction temperature of the liquid condensate but above the temperature at which the solidified condensate liquefies, so that the latter melts and goes into solution with the brine. If desired the jacket may be furnished with baffles, one of which is illustrated at 9, for giving a tortuous path to the brine flow. The brine is for the purpose of cooling the gaseous mixture which enters by the conduit 10, below the critical temperature at which some of its constituents condense, the dried methane, which does not condense at said critical temperature being discharged by way of the conduit 11. The separating chamber 5 may be provided with baffles such as the baffle 12 for causing a tortuous flow of the gaseous mixture while in said chamber and bringing all parts into proximity to the chilled walls of said chamber.

In the present group of gases forming the mixture with which the illustrative embodiment of the invention deals, the temperature is made sufficiently low to cause the water vapor to freeze into a solid snow which collects on or around the baffles 13 extending into the conveyer tank. The gasoline, at the same time, condenses into a liquid which flows into the conveyer tank. The latter communicates with the brine tank at one end by means of a pipe 14 connected to the discharge side of a pump 15 which is run by any suitable source of power such as the motor 16. The induction side of said pump is connected with the brine tank by means of the pipe 17. The opposite end of the conveyer tank communicates with the brine tank, a steady endless stream of brine being pumped into the conveyer tank and returning to the brine tank. The brine which circulates around the wall of the separating chamber 5 is of a different batch from the brine which circulates between the conveyer tank and brine tank, the temperature of the latter being sufficiently high to melt and carry away the snow formed by the water vapor which has condensed upon the baffles 13. The water thus formed mingles with the brine diluting the same and necessitating its renewal from time to time, an inflow pipe 19 being provided for this purpose. Meanwhile the gasoline has collected on top of the layer of brine circulating through the conveyer tank and is carried into the relatively sluggish current of the brine in the brine tank 1, where it forms a gasoline layer 20 floating upon the brine above the level of the induction and discharge pipes of said brine tank and the depth of which may be viewed through the sight glass 21. A siphon 22 in provided for drawing away the gasoline, the inner end of said siphon terminating within the brine tank adjacent the bottom of the layer of gasoline. Care must be taken to maintain the brine level slightly below the mouth of the inner end of the siphon to avoid the brine being drawn over with the gasoline. To this end a discharge pipe 23 is provided for draining off some of the brine, from time to time as the quantity of the latter becomes augmented through dilution with the snow formed in condenser tank. In the interest of thermal efficiency the enclosure 6 is covered exteriorly with a heat insulating coating 24.

Having described our invention what we claim as new and desire to secure by Letters Patent, is:—

1. Apparatus for segregating a specific gas or gases from a mixture of gases having critical temperatures so related that one becomes liquid while another solidifies at said critical temperature, including a condensing chamber, a conveyer tank and a brine tank, said condensing chamber being in superposed relation to said conveyer tank, a member enclosing said condensing chamber and spaced therefrom forming a jacket for the reception of a refrigerating medium, means communicating with said condensing chamber for admitting and discharging the mixture, baffles in said chamber giving a tortuous flow to said mixture, collecting plates in the conveyer tank for receiving the solid condensate from said mixture, conduits connecting the opposite ends of said conveyer tank and brine tank forming a closed circulation system, a pump in said system producing a continuous flow through said conveyer and brine tanks and a discharge pipe in said brine tank having the lower end thereof at the proper level to withdraw a layer of non-miscible liquid condensate from said mixture which may collect in said brine tank.

2. Apparatus for collecting the liquid condensate of one or more of the gases in a mixture of gases including a condensing chamber into which said mixture of gases is introduced, upper and lower tanks connected together at remote points of pipes, forming a conduit for the closed circulation of a liquid vehicle non-miscible with the liquid condensate, said condensing chamber being in open communication with the upper of said tanks, means for causing circulation of said liquid vehicle serially through said tanks and pipes, the latter being connected to the lower tank below the level of said liquid vehicle therein, and a discharge pipe for the liquid condensate, opening into the lower tank at a point above the level of said liquid vehicle.

3. Apparatus for collecting the liquid condensate of one or more of the gases in a mixture of gases including a condensing chamber into which said mixture of gases is introduced, upper and lower tanks connected together at remote points by pipes, forming a conduit for the closed circulation of a liquid vehicle non-miscible with the liquid condensate, said condensing chamber being in open communication with the upper of said tanks, means for causing circulation of said liquid vehicle serially through said tanks and pipes, the latter being connected to the lower tank below the level of said liquid vehicle therein, and a discharge pipe for the liquid condensate, opening into the lower tank at a point below the level of said liquid vehicle and means for subjecting the mixture of gases in said condensing chamber to the critical temperature of the gases producing said liquid condensate.

4. Apparatus for segregating a specific gas or gases from a mixture of gases having critical temperatures so related that one becomes liquid while another solidifies at the temperature to which said mixture of gases is subjected, including a condensing chamber, a conveyer tank and a brine tank, said condensing chamber being in open communication with said conveyer tank, collecting plates in said conveyer tank for receiving a deposit of the solid condensate from said mixture, pipes connecting the opposite ends of said conveyer tank and brine tank forming a closed circulation system, a pump in said system producing a continuous flow through said conveyer and brine tanks, a discharge pipe in said brine tank having the lower end thereof at the proper level to withdraw a layer of non-miscible liquid condensate from said mixture which may collect in said brine tank, and a discharge for said brine tank.

In testimony whereof we have hereunto set our hands.

HORACE DUMARS.
WM. SPENCER BOWEN.